FIG. 1
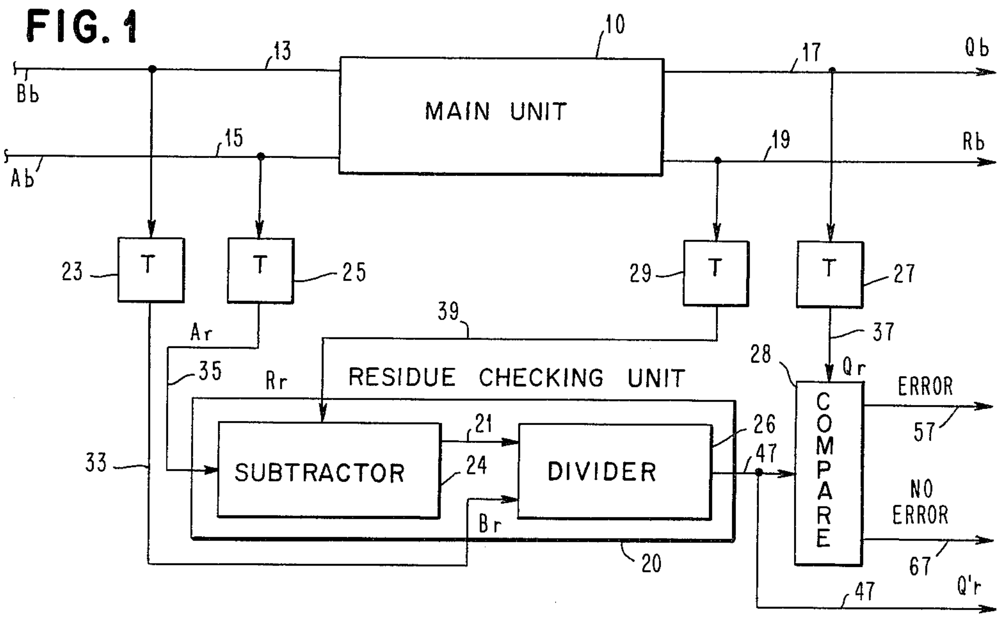
FIG. 4
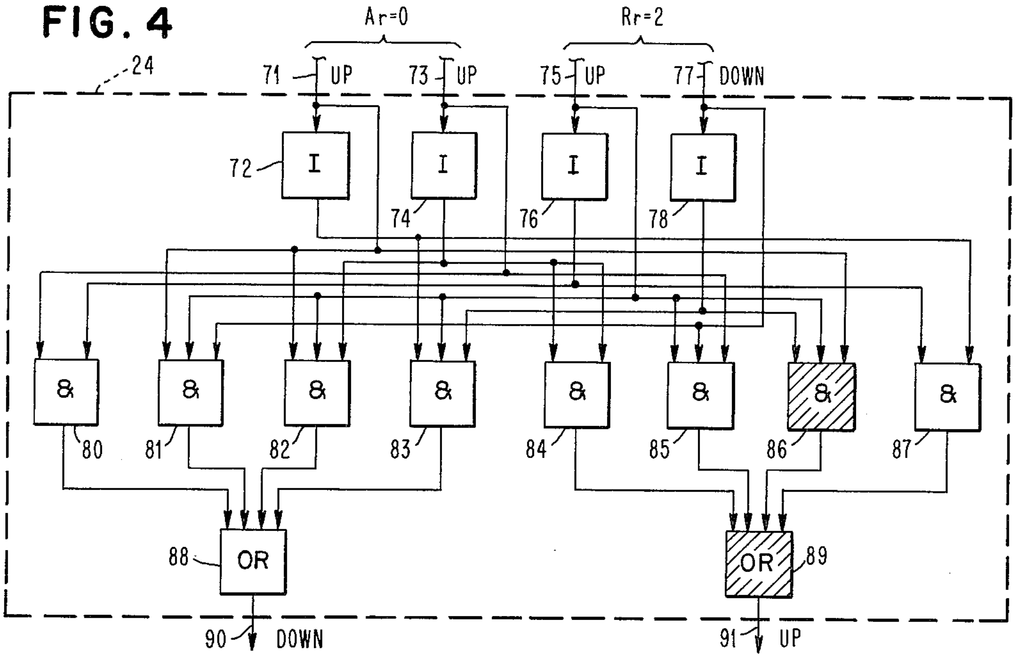
FIG. 2
X ⊖ Y
| X \ Y | 0 | 1 | 2 |
|---|---|---|---|
| 0 | 0 | 2 | 1 |
| 1 | 1 | 0 | 2 |
| 2 | 2 | 1 | 0 |
FIG. 3
X ÷ Y
| X \ Y | 1 | 2 |
|---|---|---|
| 0 | 0 | 0 |
| 1 | 1 | 2 |
| 2 | 2 | 1 |
INVENTOR
GERHARD E. HOERNES
BY J. Jancin Jr.
ATTORNEY Jan. 4, 1966 G. E. HOERNES 3,227,865

RESIDUE CHECKING SYSTEM

Filed June 29, 1962

3 Sheets-Sheet 2

Jan. 4, 1966 G. E. HOERNES 3,227,865

RESIDUE CHECKING SYSTEM

Filed June 29, 1962 3 Sheets-Sheet 3

3,227,865
RESIDUE CHECKING SYSTEM

Gerhard E. Hoernes, Poughkeepsie, N.Y., assignor to International Business Machines Corporation, New York, N.Y., a corporation of New York Filed June 29, 1962, Ser. No. 206,423
6 Claims. (Cl. 235—153)

This invention relates to electronic residue code systems; more particularly, the invention relates to an electronic residue code checking system that is especially suited for checking the arithmetic division operation of a digital computer.

It is generally known that one of the preferred ways of error checking the operations of a computer involves the familiar "duplication" technique; that is, for every operation that is performed by the computer, the identical operation is repeated and the two results generated are compared for identity. Identity between the two independently generated results gives assurance that the operation has been performed correctly. It is also well known that the main disadvantages of the "duplication" checking technique are that either twice the equipment, or twice the amount of time, is generally required to generate the two results for comparison.

In order to minimize these disadvantages, the prior art has developed a technique which involves the use of the residue, or modulo, code. It is noted that the residue code, also known as the modulo code, is formed from a natural number (the term natural number is used to denote an original number in some number system) by defining the residue of any integer to be the least positive integral remainder after the given integer has been divided by another number, known as the base. Thus, the number 7 is defined to be congruent to 1MOD3. (Divide 7 by 3 and the remainder is 1.) The number 1 is referred to as the residue. Although there are some restrictions, the choice of a base is arbitrary within limits; thus, the number 7 can be said to be congruent to, alternatively, 1MOD3, 2MOD5, 0MOD7 . . ., etc. In the examples just given, the number 7 is representable by the residues 1, 2 or 0. Having once decided upon one fixed base, all natural numbers have their congruent residues.

Arithmetic operations within the residue code—assuming, for simplicity, one fixed base—are also defined and bear a one-to-one relationship to the corresponding arithmetic operation within the natural number domain. That is, residue representations of natural numbers can be added and, when added according to a truth table, will present a residue result which is identical to the residue of the corresponding result of the addition process in the natural number domain. Similarly, the subtraction process and the multiplication process are also defined within the residue domain by their respective truth tables and, again, the residue result of these processes will have a one-to-one correspondence with the residue of the result of corresponding operation in the natural number domain.

An example will now be given which illustrates the above-mentioned properties of the residue code. Assume that it is desired to add the number 25 to the number 26. It is known that the result, or sum, will be 51. The residue of the number 25, to the base 3, is 1; that is, 25 divided by 3 will leave a remainder of 1. The residue of the number 26, to the base 3, is 2; that is, 26 divided by 3 will leave a remainder of 2. Therefore, the residue of the number 25 is a 1 and the residue of the number 26 is a 2. If these two residues are added to each other according to the rules of addition in the residue code, the result will be a residue of 0. That is, residue 1 added to a residue 2, gives a residue 0.

Comparing the residue of the addition process in the residue code with the residue of the result in the natural number system, it is noted that the two residues are identical; namely, the sum of 51 has a residue of zero. That is, the residue developed from a residue calculation is identical to the residue of the result generated in the natural number domain. Similar examples can also be developed for the residue processes of subtraction and multiplication. A more detailed description of the above-mentioned properties of the residue code may be had in an article by Harvey L. Garner, entitled "The Residue Number System" in the IRE Transactions on Electronic Computers, June 1959, page 140.

Thus, for the immediate discussion the residue code can be characterized in that it represents an "index" or "abstract" of the magnitude of a natural number. The one-to-one relationship of operations within the residue code to the related operations in the natural number domain has considerably simplified the "duplicate" residue circuitry necessary for a check on the operations of a digital computer. However, because of the peculiar properties of the residue code with respect to the division process, the residue code checking systems of the prior art have had to deviate from a true "duplication" check in the case of supervising the division operation of the computer. That is, division is defined (i.e., it will yield a meaningful result) in the residue code only when the corresponding division with natural numbers yields an integral result. It has heretofore not been possible to perform a duplicate check on the division process where the division process has yielded a remainder because the prior art "duplicate" residue circuitry has been unable to repeat the identical operation, namely, division.

Accordingly, it is one principal object of this invention to provide a new and improved residue system for producing a residue equivalent of the quotient generated by a computer.

A further object of this invention is to provide a new and improved residue checking system for supervising the division operation of a computer more nearly in accordance with the "duplication" technique of error checking.

Previous residue checking systems have approached the supervision of a division operation of a computer limited by the common knowledge that the division process within the residue code is undefined when the corresponding division operation in the natural number domain does not yield an integral quotient. Accordingly, the prior art systems have obviated the need for performing a duplicate division operation by noting that, whenever a division process yields a remainder, rearrangement of the familiar division algorithm equates the product of the quotient and the divisor, on the one hand, and the difference between the dividend and the remainder, on the other hand. Thus, the prior art residue checking systems have synthesized a check by utilizing a residue subtraction operation to form the residue difference between the dividend and the remainder, on the one hand, and the residue product of the residue of the quotient and the divisor, on the other hand, and have compared them for identity. In this manner, identity between the two residue quantities compared gives a reasonable assurance that the division operation of the computer was performed correctly.

It is significant to note that neither of the generated residue quantities, between which a comparison is effected in the prior art, bears any relationship to the final result generated by the computer. That is, the check in the prior art has been an "internal" one between two "fictitious" quantities. More particularly, the product of the quotient and the divisor (as generated by the residue checking unit) bears no relationship to the quotient generated by the computer. This fact has several important consequences, among which are the following:

(a) Since the residue checking system has not generated a quantity that has a direct relationship to the quantity generated by the computer, it is not possible to utilize the quantity generated by the checking system for purposes of transmitting such a quantity, along with the quantity generated by the computer, as a check for errors in transmission.

(b) In the event an error is indicated in the prior art systems, the operation of the computer is usually halted because, as the residue generated quantity has no relationship to the computer generated quantity, it is not possible to transmit the residue generated quantity along with the erroneous computer generated quantity and postpone a check to a later time.

Accordingly, it is a further principal object of this invention to provide a division residue checking system which generates an independent quantity that bears a direct relationship to the computer unit generated quantity and which is, therefore, suitable for checking for errors in transmission of the computer generated quantity.

A further principal object of this invention is to provide a division residue checking system which allows the computer to continue to operate and postpone a check in case a discrepancy is noted between the computer generated result and the residue unit generated result.

In accordance with the invention, there is provided a tandem residue unit which is adapted to cooperate with the main processing unit of a digital computer and which comprises means for generating a residue difference between the residue of the dividend and the residue of the remainder, and residue divider means for dividing that residue difference by the residue of the divisor, whereby the divider means generates a residue quotient which is available for comparison purposes with the computer generated quotient.

With reference to the above-stated limitation of the residue code, namely that the process of a residue division is defined only when the resulting quotient is an integral, it is noted that the residue division means of the instant invention will perform this process and produce a valid result because the residue difference between the dividend and the remainder will always be integrally divisible by the residue of the divisor. This fact can be demonstrated, for example, by noting that, while 7 divided by 3 will not yield an integral quotient (i.e., the remainder is 1), 7 minus 1 (i.e. 6) divided by 3 will give an integral quotient, namely, 2. While the above example has been illustrated in the natural number domain, it holds equally as well within the residue code. Therefore, the residue division means of the instant invention yield a valid residue quotient, which quotient, if no error has resulted, will be identical to the residue of the computer generated quotient. Comparison means are included in the invention to effect a comparison between said two quotients and, if they are alike, will generate a no error signal, thereby indicating that the operation of the processing unit has been carried out without error.

Assuming that, for some reason, there is a discrepancy between the two generated quotients and that the comparison unit, therefore, yields an error signal, various possible defects can be stipulated. It should be noted at this point that, in the ensuing description, only the occurrence of a single error is considered. Thus, for example, the error may lie in the incorrect generation of a quotient by the main processing unit. Taking note of the fact that only single errors are stipulated, in such an event, the residue generated quotient is obviously the correct quotient. Further, taking into consideration the relative complexity of the main processing unit (as opposed to the tandem residue checking unit), it is more likely that the error will occur in the main processing unit than in the residue checking unit.

Upon receipt of an error indication, it may be, as it heretofore has been, necessary to halt the operation of the computer to locate the source of the error and correct it. This course of action is open to a number of objections, the chief of which is that it ties up the computer equipment while a particular unit is being repaired. The fact that the tandem residue unit of this invention has generated a correct residue of what the quotient should have been does not necessitate that the computer operation be interrupted. Thus, it may in some instances be more desirable to let the computer continue to operate with the erroneous quotient, provided that an indication of such a fact is made. For this purpose, it is quite advantageous to utilize the residue quotient furnished by the tandem checking unit as "flag" signal that will be associated with the erroneous quotient. Such a flag signal, which may comprise several bits, may serve a number of important purposes. For example, flag bits may be transmitted along with the erroneous quotient into memory storage, thereby providing valuable clues to a technician who may be attempting to determine the location of the error by noting which quantity is erroneous. The availability of a correct signal representing what the quotient should have been improves what is known as the "limp-along" feature of a computer. In effect, it allows postponement of error detection and error correction operations because the erroneous quantities are permanently tagged with their flag bits.

It is obvious that, when a division operation of a computer is to be monitored by residue checking means in accordatnce with the above invention, it may sometimes result that the residue of the divisor is 0. For example, the residue representation to the base 3 of the number 6, a possible divisor in a given division process, would be a 0. Since residue division by 0 is not defined (alike to the difficulties in the natural number domain), there are provided, according to this invention, auxiliary means for treating such a possibility. In the event that the residue of a divisor is 0, additional circuit means are responsive to such an indication and these additional circuit means will effect a comparison between the residue of the divisor, on the one hand, and the residue difference between the residue of the dividend and the residue of the remainder, on the other hand. A correct division will, in this case, be indicated by equality of the two quantities compared. That is, if the comparison means indicate that, when the residue of the divisor is 0, the residue difference between the dividend and the remainder is also 0, the correctness of the operation performed by the main processing unit has been established.

The foregoing and other objects, features and advantages of the invention will be apparent from the following more particular description of a preferred embodiment of the invention, as illustrated in the accompanying drawings.

FIG. 1 is a schematic diagram of an illustrative example of a residue error checking system according to the invention cooperating with a main processing unit of a digital computer.

FIG. 2 is a truth table which establishes the corresponding output conditions for respective input conditions of a residue subtractor to the base 3 according to the invention.

FIG. 3 is a truth table which establishes the corresponding output conditions for respective input conditions of a residue divider to the base 3 according to the invention.

FIG. 4 is an illustrative embodiment of a device for performing residue subtraction to the base 3 according to the invention.

Figure 5:
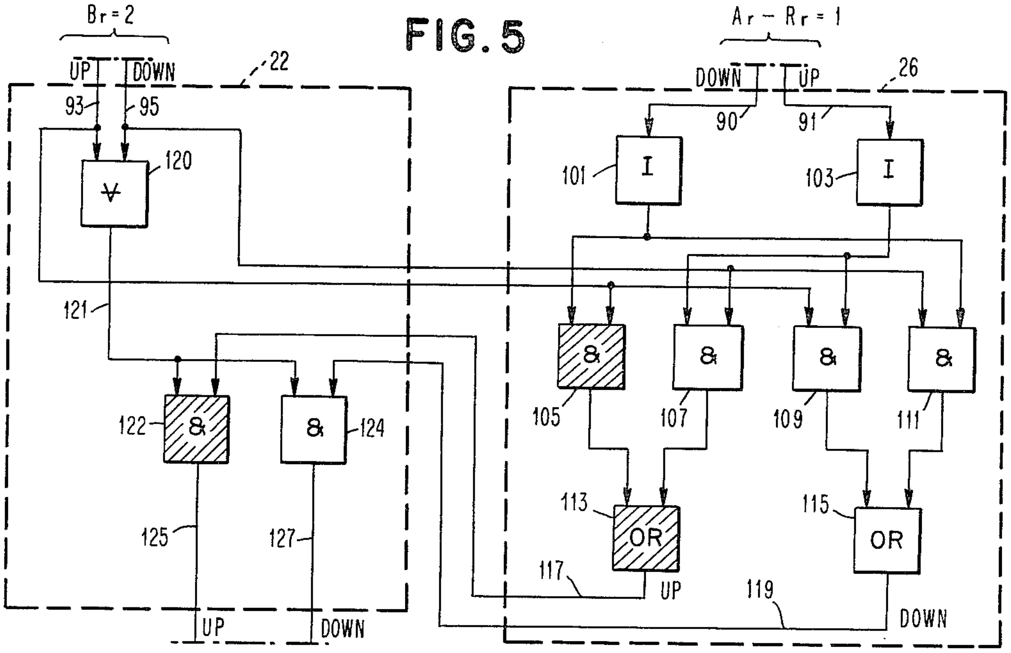
FIG. 5 is an illustrative embodiment of a device for performing residue division to the base 3 according to the invention.

Reference may now be had to FIG. 1 which discloses a main unit 10 of a digital computer that is adapted to perform all types of arithmetic operations, including, for example, division. To illustrate the operation of the invention with respect to checking the division process as performed by the main processing unit 10, there are shown two input lines 13 and 15, each line respectively transmitting digital signals representing the divisor $B_b$, and the dividend $A_b$. Although lines 13, 15 are shown as single lines for purposes of illustration, they may comprise a plurality of lines to provide a path for the signals, as for example when the main processing unit 10 operates in a parallel mode. It is immaterial for the present whether the main processing unit 10 operates in a serial, parallel, or mixed serial-parallel, mode. Similarly, the coding for the signals on lines 13, 15 may be any suitable digital code, for example the well-known binary code.

Main processing unit 10 generates a result in response to the division operation which will be represented on lines 17, 19; namely the generated binary quotient $Q_b$, and the generated binary remainder, $R_b$, will appear on lines 17, 19 respectively. For the purposes of the present invention it is immaterial in what particular manner main processing unit 10 generates the results $Q_b$ and $R_b$ in response to the entering signals $A_b$, $B_b$.

Translators 23, 25 translate the binary signals $A_b$ and $B_b$ into their congruent residues, while translators 27, 29 translate the binary signals $Q_b$, $R_b$, into their congruent residues. A translator of the type used will be described more fully hereinafter. For the present purpose it is sufficient to note that these translators form a congruent residue, or "abstract," of the signals appearing on their respective input lines.

Signal lines 33, 35 transmit the residue representations $B_r$ and $A_r$ of the respective binary divisor $B_b$ and the binary dividend $A_b$. Lines 33 and 35 each provide an input to the residue checking unit 20 which comprises a residue subtractor 24 cooperating with a residue divider 26. Translators 27, 29 also transmit on their respective output lines 37, 39, the residue representations of the quotient $Q_b$ and the remainder $R_b$ as generated by the main processing unit 10. The residue representation of the remainder, $R_r$, is transmitted on line 39 and provides a second input to residue subtractor 24. The exact details of residue subtractor 24 will be described more fully below, but at the present time it is sufficient to note that residue subtractor 24 will provide an output signal on line 21 which represents the residue difference between the quantities $A_r$ and $R_r$. Line 21 transmits the residue difference, $A_r$–$R_r$, to residue divider 26, which also accepts the residue divisor $B_r$ from line 33. The exact nature of residue divider 26 will be described more fully below. For the present purposes it is sufficient to note that residue divider 26 performs a residue division and thereby produces, on line 47 a signal representing a residue generated quotient $Q'_r$.

Comparison unit 28 compares the signal $Q'_r$ with the signal $Q_r$ appearing on line 37. Line 37 carries a signal which represents the output of translator 27 which translates the binary signal $Q_b$ to its congruent residue $Q_r$. The comparison unit 28 will be more fully described below but for the present purposes it is sufficient to note that it will compare $Q'_r$ and $Q_r$ for identity. If the two quantities compared are identical, a NO ERROR signal appears on line 67, thereby indicating that the division process performed by the main processing unit 10 is correct. In other words, identity between two substantially independently generated results gives a good assurance that the division operation has been without error. In such a case, the residue generated quotient, $Q'_r$, is available as a group of checking bits to detect for errors in the transmission of the computer generated quotient $Q_b$.

If the comparison unit 28 indicates that the quantities $Q'_r$ and $Q_r$ are unlike, it is likely that an error has occurred, and therefore an error signal is provided on line 57. As previously noted, it is quite likely that the error has occurred in the main processing unit 10. This means that a faulty $Q_b$ has been generated. Thus, as between the two quantities $Q'_r$ and $Q_r$ which are compared, $Q_r$ is incorrect and $Q'_r$ (on the assumption that only single errors have occurred) is correct. As previously noted, the correct residue quotient, $Q'_r$, may be valuable as a group of "flag" bits to indicate that the computer generated quotient $Q_b$ is in error. For example, the residue quotient may be transmitted along with the computer generated quotient into memory storage where it can later be checked for identity to diagnose the error in the machine. The indication of which quantity stored in memory is erroneous, gives valuable clues in this regard.

It should be noted that the principle of this invention is applicable to any base, or modulus. As a practical matter, however, a judicious choice must be made in any given case by suitably balancing the considerations of increasing complexity of equipment as the base increases with the simplicity, but corresponding lesser information carrying capability, that goes with a smaller base. That is, it may be desirable to work with a base of 7, or 5, or 3. For purposes of clarity and ease of understanding this invention, the subsequent discussion will be confined to an illustrative embodiment employing the base 3. However, this is to be considered in no way as limiting the invention to this base.

Referring now more particularly to FIG. 2, there is shown a truth table for residue subtraction, according to the base 3. A circle drawn around the conventional minus sign indicates a residue operation. When working with a base of 3, the possible residues, by definition, are 0, 1, and 2. Thus, two quantities, X and Y, between which it is desired to effect a residue subtraction, can each be represented by any one of the three previously mentioned residues. The correspondence of the results, as indicated by the truth table, with the similar operation in the natural number domain, will now be indicated. As a representative example, assume that it is desired to subtract 14 from 18. The residue of 18 is, according to the rules previously mentioned, 0. The residue of the number 14 is 2. The residue of the result, namely 4, is 1. This is precisely what is indicated by the truth table in FIG. 2, wherein if the minuend X is 0, and the subtrahend Y is 2, the result will be a residue of 1. Other examples can be used to show the validity of the truth table in FIG. 2.

Referring now to FIG. 4, there is disclosed a residue subtractor 24 operating in accordance with the truth table established in FIG. 2. Signal lines 71, 73 represent the residue of the dividend, $A_r$. Since the residue of the dividend can be only one of three possibilities, i.e. 1, 2, or 0, two signal lines are sufficient to represent these three possibilities. Thus, $A_r$ would be represented on line 71, 73 at any given instant, by the combination of input signals appearing thereon. For example, the residue of $A_r$ would be a 0 when line 71 is UP, and line 73 is also UP. For purposes of definition, a line is said to be UP, when the signal thereon resides at one determined voltage, or current, level. A line is said to be DOWN, when the signal impressed thereon resides at another determined voltage, or current, level. According to these definitions, the signal $A_r$, appearing on lines 71, 73, can be defined according to the following illustrative coding scheme:

| Line 71 \ 73 | UP | DOWN |
|---|---|---|
| UP | 0 | 2 |
| DOWN | 1 | – |

A similar coding scheme can be established for lines 75, 77 which provide the residue subtractor 24 with signals representing the residue of the remainder $R_r$. Such a coding scheme is given below:

| Line 71 \ 77 | UP | DOWN |
|---|---|---|
| UP | 0 | 2 |
| DOWN | 1 | – |

A description will now illustrate the operation of residue subtractor 24. Assume that, in accordance with the previous example, the residue of the divided, $A_r$, is 0, and that the residue of the remainder, $R_r$, is 2. This would be represented, in accordance with the coding scheme established above, by lines 71, 73 being UP, and lines 75, 77 being UP and DOWN, respectively. The UP signal on line 71, which by-passes inverter 72, will provide an UP signal to AND gates 81, 82 and 86. The UP signal on line 71 which is inverted by inverter 72 will not serve to condition any AND gates. The UP signal on line 73, which by-passes inverter 74, will serve to provide an UP signal to AND gates 80, and 85. The UP signal on line 73 which is inverted by inverter 74 will not serve to condition any AND gates. The UP signal on line 75, which by-passes inverter 76, will provide an UP signal to AND gates 81, 82, 83 and 86. The UP signal on line 75, which is inverted by inverter 76, will not serve to condition any AND gates. The DOWN signal on line 77, which by-passes inverter 78, will not serve to condition any AND gates. The DOWN signal on line 77, which is inverted by inverter 78, will provide an UP signal to AND gates 83 and 86.

A review of which AND gates 80–87 have been activated in response to the signals on lines 71, 73, 75 and 77, will show that of all of the AND gates 80–87, only AND gate 86 has received all the necessary UP signals to be activated. That is, none of the other AND gates will be activated; only AND gate 86 will be fired.

The resultant output of residue subtractor 24 will, therefore, be indicated by the state of activation of OR circuits 88, 89. As previously noted, none of the AND gates 81–83 were activated by the input signals to residue subtractor 24. Therefore, OR gate 88 is not provided with a signal, and, therefore, its output on line 90 will be DOWN. On the other hand, AND gate 86, as previously noted, has been activated by the input signals to residue subtractor 24 and the output from AND gate 86 activates OR gate 89, which results in an UP signal on line 91. Therefore, the output of residue subtractor 24 is represented by a DOWN signal on line 90, and an UP signal on line 91.

The coding scheme for the output lines 90, 91 of residue subtractor 24, is given below:

| Line 90 \ 91 | UP | DOWN |
|---|---|---|
| UP | 0 | 2 |
| DOWN | 1 | |

Reference to this coding scheme and to the example just discussed, will show that residue subtractor 24 has indicated a residue of 1, when the residue of the minuend was a 0, and the residue of the subtrahend was a 2. This is in conformance with the truth table established for such a residue subtractor in FIG. 2.

Reference may now be had to FIG. 3, which discloses a truth table for residue division to the base 3. Since the residue dividend X is representable by any one of the residues, 1, 2, 0, but the residue divisor is only meaningful when it is either 1, or 2, FIG. 3 is actually a 2 by 3 truth table, whereas FIG. 2, which is the truth table for residue subtraction, is a 3 by 3 truth table. This distinction between FIGS. 2 and 3 illustrates the well known difficulties of residue division, when the residue of the divisor is 0. That is, since residue division when the residue of the divisor is 0, is not defined, no attempt is made to include it in a truth table, such as shown in FIG. 3.

A representative example will now be discussed which shows the conformance of the truth table in FIG. 3 to an actual division process performed in the natural number domain.

Suppose that it is desired to divide 55 by 5. The quotient, namely 11, is an integral one, and, therefore, the corresponding residue process will bear a valid one-to-one correspondence with the division process in the natural number domain. The residue of the dividend 55, to the base 3, is 1. The residue of the divisor 5, to the base 3, is 2. According to the truth table shown in FIG. 3, when the residue of the dividend X is 1, and the residue of the divisor Y, is 2, the result predicted by the truth table in FIG. 3, will be a residue of 2. Relating this to our example in the natural number domain, it can be seen that the quotient, namely 11, has a residue of 2, to the base 3. Thus, the residue of the result, namely 2, is identical to the resultant residue, namely 2, as predicted by the truth table in FIG. 3. Other examples can show the validity of the truth table in FIG. 3.

Reference may now be had to FIG. 5, which discloses residue circuitry operating in accordance with the truth table shown in FIG. 3. FIG. 5 broadly comprises a residue divider unit 26 and a gating unit 22. Residue divider 26 accepts inputs on lines 90, 91 which transmit the residue difference, $A_r$–$R_r$. Residue divider 26 further accepts inputs on lines 93, 95 which transmit the residue of the divisor $B_r$. Assume that, in accordance with the examples previously discussed, the residue difference, $A_r$–$R_r$, is 1; this would be represented by line 90 having a DOWN signal impressed thereon, and line 91 having an UP signal impressed thereon. (Lines 90, 91 transmit the output of residue subtractor 24, as shown in FIG. 4). Similarly, if we assume the residue of the divisor, $B_r$, to be 2, a coding scheme can be established for lines 93, 95 which transmit the residue representation of the divisor, $B_r$. Such a coding scheme is given below:

| Line 93 \ 95 | UP | DOWN |
|---|---|---|
| UP | 0 | 2 |
| DOWN | 1 | – |

In accordance with coding scheme for lines 93, 95, when the divisor $B_r$, is 2, this would be represented by line 93 being UP, and line 95 being DOWN.

The DOWN signal on line 90 is inverted by inverter 101 to provide an UP signal to AND gates 105, 111. The UP signal on line 91 is inverted by inverter 103, which provides a DOWN signal to AND gates 107, 109. The UP signal on line 93 is transmitted by line 93 to AND gates 105, 109. The DOWN signal on line 95 is transmitted by line 95 to AND gates 107, 111.

A review of which of AND gates 105, 107, 109, 111 have received all UP signals on their inputs, shows that of all the AND gates mentioned, only AND gate 105 has received all of its necessary UP signals. This means that only AND gate 105 will provide an UP signal to OR gate 113. OR gate 115 will not be fired and therefore will remain inactive, or DOWN. The output of residue divider unit 26 will therefore be an UP signal on line 117, and a DOWN signal on line 119. For convenience, the output conditions on line 117, 119 can be classified in accordance with a coding scheme as used previously, to designate the residue equivalent generated by residue divider unit 26 in response to the division upon the quantity $A_r-R_r$ by $B_r$. Such a coding scheme is given below.

| Line 117 \ 119 | UP | DOWN |
|---|---|---|
| UP | 0 | 2 |
| DOWN | 1 | – |

The output of residue divider unit 26 is provided to a gating network 22, which comprises EXCLUSIVE OR circuit 120 and AND gates 122, 124. An EXCLUSIVE OR circuit is defined in the prior art as a circuit which provides an output, only when its inputs are not alike. This means, in the context of this invention, that EXCLUSIVE OR circuit 120 will provide an UP signal on line 121 at all times, except when lines 93, 95 are simultaneously UP. (The condition of lines 93, 95 being simultaneously DOWN is not a case defined, in the context of this invention.) The significance of the condition of lines 93, 95 being simultaneously UP will be described below. For the present purposes, it is sufficient to note that, as long as lines 93, 95 are UP, and DOWN, respectively, or viceversa, line 121 will provide an UP signal to AND gates 122 and 124, thereby activating AND gates 122 and 124 to be fired by signals on lines 117, and 119, which represent the output of residue divider unit 26. That is, if AND gates 122 and 124 receive an UP signal on line 121, an UP signal on line 117 will result in AND gate 122 being activated to provide an UP signal on its output line 125; similarly, a DOWN signal on line 119 will not activate AND gate 124, which results in a DOWN signal on line 127.

To summarize, therefore, AND gates 122, 124 function to gate the outputs of OR gates 113, 115 in response to the control signal generated by EXCLUSIVE OR circuit 120 on line 121. That is, an UP signal on line 121 assures that the outputs on lines 125, 127 will be identical to the outputs of residue divider unit 26, on lines 117, 119.

Figure 6:
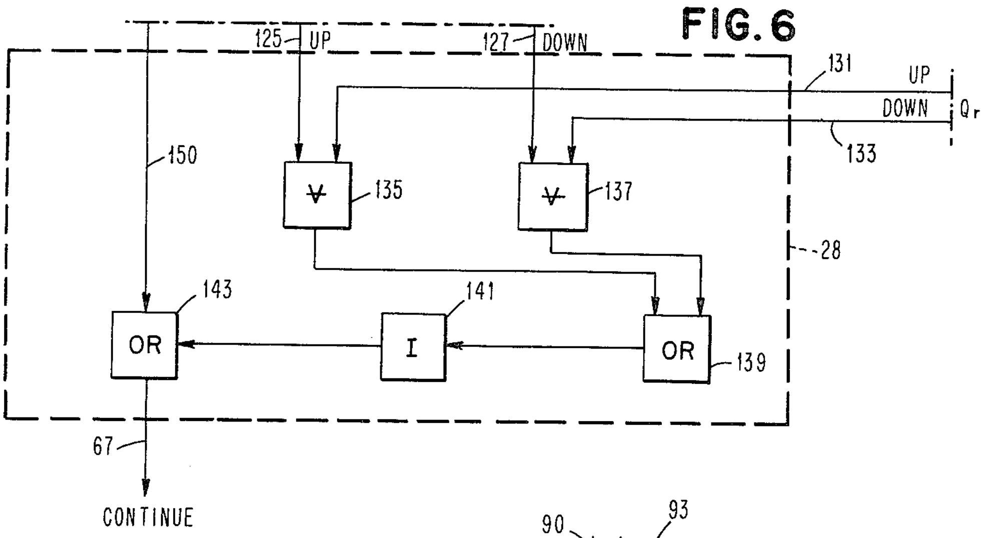
FIG. 6 is an illustrative embodiment of a comparator according to the invention.

Reference may now be had to FIG. 6 which shows a comparator 28 which functions to compare the gated output of residue divider 26, as it appears on lines 125, 127, with the residue of the computer generated quotient $Q_r$. The input to the comparator 28, on lines 125, 127 represents the residue generated quotient, $Q'_r$. In line with the previous examples, the output of residue divider unit 26 is represented by an UP signal on line 125, and a DOWN signal on line 127. To illustrate the operation of comparator 28, let it be assumed that the residue of the computer generated quotient $Q_r$ is represented by an UP signal on line 131 and DOWN signal on line 133. The residues of $Q_r$ are, by definition, 0, 1, or 2. This can be represented on lines 131, 133 in accordance with the coding scheme given below:

| Line 131 \ 133 | UP | DOWN |
|---|---|---|
| UP | 0 | 2 |
| DOWN | 1 | – |

As previously described, an EXCLUSIVE OR circuit will have a signal on its output only when the input signals are unlike. Conversely, identity of input signals to an EXCLUSIVE OR circuit will not produce an output, i.e. will produce a DOWN output. In the context of this invention, this means that EXCLUSIVE OR circuits 135, 137 will not produce any output signals when their input signals are alike. That is, if the signals on line 125, and line 131, are simultaneously UP (or DOWN), EXCLUSIVE OR circuit 135 will produce a DOWN signal on its output. Similarly, when lines 127 and 133 are simultaneously UP (or DOWN), EXCLUSIVE OR circuit 137 will also produce a DOWN signal on its output. If neither of EXCLUSIVE OR circuits 135, 137 have produced an UP signal, OR circuit 139 produces a DOWN signal which is inverted by inverter 141 to provide an UP signal to OR gate 143. OR gate 143 in turn, produces an UP signal on its output 67, which is a CONTINUE signal, thereby indicating that the comparison between $Q'_r$, as represented on lines 125, 127, and $Q_r$, as represented on lines 131, 133 has proven successful, i.e. they are alike.

Assume that, for some reason, the signals on lines 125, 127 do not correspond with the signals on line 131, 133. This is tantamount to saying that $Q'_r$, as generated by the residue divider unit 26, and $Q_r$, do not agree and that, therefore, an error has occurred. Nonidentity of input signals to either one of EXCLUSIVE OR circuits 135, 137 will produce from one of them an UP signal which is transmitted by OR circuit 139 to inverter 141. Inverter 141 inverts the UP signals thus produced, to a DOWN signal, which will not activate OR circuit 143. Therefore, the output of OR circuit 143 will be a DOWN signal on line 67. This means that an error has occurred, because the required CONTINUE signal is not provided on line 67. In other words, an error is indicated by the absence of a CONTINUE signal. If desirable, it is possible to feed line 67 into an inverter the output of which will indicate an error. In other words, the ERROR signal can be derived from the CONTINUE signal by merely passing it through an inverter.

As previously noted, residue division is not defined (i.e. it is not meaningful) when the residue of the divisor is 0. In such a case, i.e. when the residue of the divisor $B_r$ is 0, the output of residue divider 26 is meaningless. It therefore doesn't make much sense to compare the output of residue divider 26 with the residue of the quotient generated by the computer, namely $Q_r$. It is for this reason that the gating network 22 functions to gate the output of residue divider 26 into comparator 28, only when the residue of the divisor $B_r$ is not 0. If the residue of the divisor, namely $B_r$, is 0, this would be represented, in accordance with the coding scheme previously outlined, by lines 93, 95 being simultaneously UP. In such a a case, EXCLUSIVE OR circuit 120 will provide a DOWN signal on line 121, thereby blocking AND gates 122 and 124. This means that the signals on lines 125, 127 will be DOWN simultaneously. A reference to the coding scheme for lines 125, 127 will show that the condition of both lines being DOWN simultaneously, is not defined. That is, the condition of lines 125, 127 being DOWN simultaneously does not represent one of the three possible residues 1, 2, or 0.

Obviously, when lines 125, 127 are simultaneously DOWN (which in the terms of this invention doesn't mean anything) it makes no sense to compare these signals with the signals representing the residue $Q_r$ of the computer generated quotient. If the residue $Q_r$ of the computer generated quotient is either 1, 2, or 0, it follows that at least one of EXCLUSIVE OR circuits 135, 137 will provide an UP signal which will be transmitted by means of OR gate 139 to inverter 141 which in turn inverts the UP signal so that it appears as a DOWN signal that is unable to activate OR circuit 143 and thereby indicate a CONTINUE signal. In the event that the residue $B_r$ of the divisor is 0, it is clear then that comparator 28 will not compare the residue $Q_r$ of the quotient generated by the computer with the output signals of residue divider unit 26. In such an event, the comparison occurs, in a manner described below.

Figure 7:
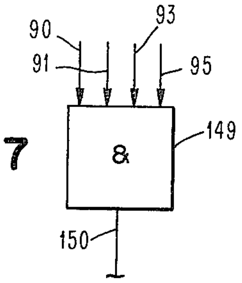
FIG. 7 is an illustrative embodiment of means to indicate a comparison when the residue of the divisor is zero.

Reference may now be had to FIG. 7 which discloses circuit means that may be utilized to afford a check on the correctness of the computer operation when the residue of the divisor is 0. Reference to the familiar division algorithm will indicate that an equality exists between the difference of the dividend and the remainder, or the one hand, and the product of the divisor and the quotient, on the other hand. This equality holds in the natural number domain, as well as within the residue code. Therefore, it follows that, when the residue of the divisor is 0, the residue difference between the dividend and the remainder will also be 0, if no errors are present.

In accordance with the coding scheme previously established, lines 90, 91 will be UP simultaneously when the residue difference, $A_r–R_r$, is 0. Similarly, when the residue $B_r$ of the divisor is 0, lines 93, 95 will be UP simultaneously. Thus, the AND circuit which is illustrated in FIG. 7, and which is responsive to signals on lines 90, 91, 93 and 95, will provide an UP signal on its output line 150, when all of its input lines (90, 91, 93 and 95) are UP simultaneously. In effect, then, the comparison for identity of $B_r$ with $A_r–R_r$ has been made by AND circuit 149, the output of which is provided to OR gate 143 by means of line 150 so that the required CONTINUE indication is given on line 67. Now it can be seen that if AND gate 149 fails to yield an UP signal (which would mean that not all of lines 90, 91, 95, 93 are simultaneously UP), the proper CONTINUE signal will not be given. Instead, line 67 will be DOWN, thereby indicating an error.

To summarize the comparison process then, it is clear that in the instance when the residue $B_r$ of the divisor is not 0, a regular comparison will be effected by comparator 28 in the manner as described above. If the residue of the divisor is 0, the correctness of the computer operation can still be indicated by comparing it with the residue difference $A_r–R_r$, which in that case must also be 0. If both $A_r–R_r$ and $B_r$ are 0, AND gate 149 will provide an UP signal which is transmitted to OR gate 143, thereby giving the proper UP signal on line 67 to indicate that the computer can continue.

Figure 8:
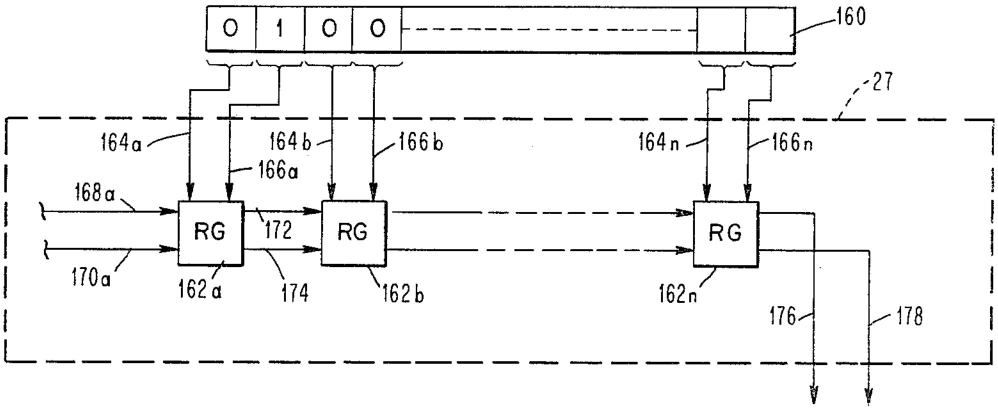
FIG. 8 is an illustrative embodiment of a translator for translating from a binary code to a residue code to the base 3.

Reference may now be had to FIG. 8 which shows an illustrative embodiment of a translator from binary code to a residue code to the base 3. There is shown a source of binary bits, such as a binary register 160. Register 160 may be used to furnish the computer with the necessary operands for a division operation, and it may also store the resultants after the operation is completed. Translator 27 is shown to cooperate with register 160 and translates the magnitude represented by the bits stored in register 160 to the congruent residue to the base 3, thereby providing residue unit 20 (FIG. 1) with the proper residues of the operands and resultants of the division operation.

Translator 27 includes a plurality of identical residue generators **162*a*–162*n*, one such generator being provided for every two bit positions of register 160; if the number of bits stored in register 160 is an odd number, the last residue generator (162*n*) would receive one of its inputs (164*n*) from the last bit and would have its other input (166*n*) connected to a constant signal level representing a zero bit. The first residue generator (162*a*) has two of its input lines (168*a*, 170*a***) connected to a constant UP signal level, representing a one bit.

The arrangement of residue generators **162*a*–162*n* in translator 27 is based on the mathematical equivalence of the residue of a binary number to the summation over the number of bits of: the product of the residue of the weight of a particular bit multiplied by the value of that particular bit. The successive residue generators (162*a*–162*n*) carry out a summation process which produces the residue of the binary number stored in register 160 on the output of the last residue generator 162*n***.

Figure 8A:
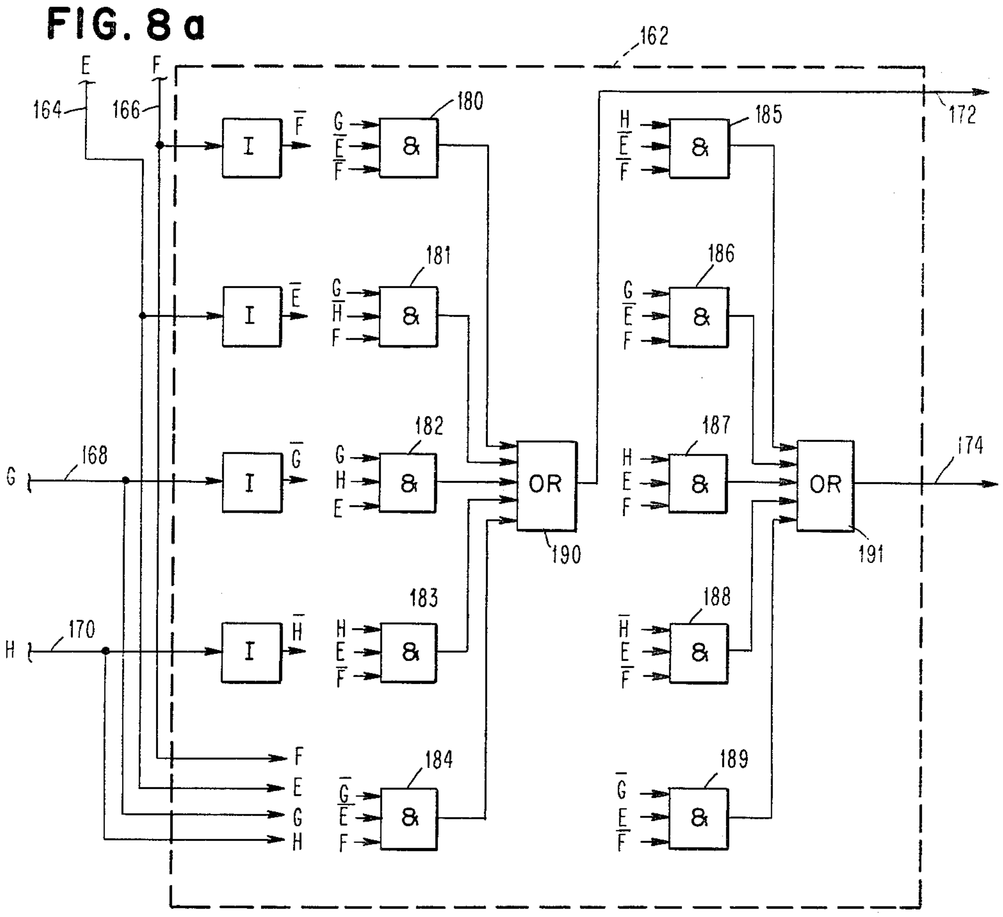
FIG. 8a is an illustrative embodiment of a residue generator for use in a residue translator.

Reference to FIG. 8*a* shows an individual residue generator 162 while may be used in a translator 27. Capital letters E, F, G and H are used to denote the inputs to residue generator 162 and the connection of the inputs to the individual AND gates 180–189. A particular one of AND gates 180–189 will provide an UP signal output only when the variables on its inputs are simultaneously UP. Depending upon which one of AND gates 180–189 is fired, one of OR gates 190, 191 will be fired to provide an UP signal on respective lines 172, 174, thereby indicating the output of residue generator 162.

Consider, as a representative example, that the binary number 0100 is stored in register 160. (This is the binary representation of the number 4, the residue of which, to the base 3, is a one.) In response to the stored binary number, residue generator **162*a* is provided with respective UP signals on lines 166*a*, 168*a*, 170*a*, and a DOWN signal on line 164*a***. Reference to FIG. 8*a* will show that this particular combination of signals energizes only AND gate 186 which results in an UP signal from OR gate 191 on line 174. Line 172 will remain DOWN as OR gate 190 will not be fired by the particular combination of input signals. The output of the residue generator **162*a* is thus a DOWN signal on line 172 and an UP signal on line 174. This output is provided to the next residue generator 162*b*, in addition to DOWN signals on lines 164*b*, 166*b* from register 160**. Reference again to FIG. 8*a* shows that the particular input conditions to residue generator **162*b* result in the firing of only AND gate 185. Therefore, the output of residue generator 162*b* is an UP signal on line 174 and a DOWN signal on line 172. Since no more bits are stored in a register 160, the output of residue generator 162*b* represents the output of the last residue generator 162*n*** for the particular case where *n* equals *b*. Thus, the output of translator 27, is, in effect, represented by a DOWN signal on line 176 (line 172 of residue generator **162*b*) and an UP signal on line 178 (line 164 of residue generator 162*b*). The coding scheme adopted on lines 176, 178 to represent the output of translator 27 is identical to the one previously employed for the residue subtractor 24 and residue divider 26**. Thus, the coding scheme is:

| Line 176 \ 178 | UP | DOWN |
|---|---|---|
| UP | 0 | 2 |
| DOWN | 1 | |

In view of this coding scheme, it is evident that the DOWN signal on line 176 and the UP signal on line 178 represent a residue one, which is the proper residue, to the base 3, of the binary number 0100, which was assumed to be stored in register 160.

While the invention has been particularly shown and described with reference to a preferred embodiment thereof, it will be understood by those skilled in the art that various changes in form and details may be made therein without departing from the spirit and scope of the invention.

I claim:

1. A residue error checking system operable with a digital computer adapted to produce signals representing the residues of a quotient, a remainder, a dividend, and a divisor, as a result of the performance of a division operation by said computer, comprising:

a first circuit means responsive to the signals representing the residues of said dividend and said remainder for producing an output signal representing the residue difference between the residue of said dividend and the residue of said remainder;

a second circuit means responsive to the signals representing the residue of said divisor and the output of said first circuit means for performing a residue division of said residue difference by the residue of said divisor, whereby said second circuit means produces an output signal representing a residue quotient; and comparison means for comparing said residue quotient generated by said second circuit means with the residue of the quotient generated by said computer, whereby, if said comparison means indicates identity between the two residue quotients compared, the correctness of the division operation performed by said computer is verified.

2. A residue system for producing a residue equivalent of the quotient produced by a digital computer adapted to also produce signals representing the residue of a remainder, a dividend, and a divisor, comprising:

a first circuit means responsive to the signals representing the residues of said dividend and said remainder for producing an output signal representing the residue difference between the residue of said dividend and the residue of said remainder;

a second circuit means responsive to the signals representing the residue of said divisor and the output of said first circuit means for performing a residue division of said residue difference by the residue of said divisor, whereby said second circuit means produces an output signal representing a residue quotient.

3. A residue error checking system operable with a computer adapted to produce signals representing each of the unique values of the residues of a quotient, a remainder, a dividend, and a divisor, as a result of the performance of a division operation by said computer, comprising:

a first circuit means responsive to the signals representing the residues of said dividend and said remainder for producing an output signal representing the residue difference between the residue of said dividend and the residue of said remainder;

a second circuit means responsive to the output of said first circuit means and to the signals representing all non-zero values of the residue of said divisor, for performing a residue division of said residue difference by the residue of said divisor; and comparison means including circuit means for comparing the output of said second circuit means with the residue of the quotient generated by said computer and circuit means responsive to a signal representing a zero value of the residue of said divisor for comparing the output of said first circuit means with the residue of said divisor, whereby an equal comparison output by said comparison means verifies the correctness of the division operation performed by said computer.

4. A residue error checking system operable with a computer adapted to produce signals representing each of the unique values of the residues of a quotient, a remainder, a dividend, and a divisor, as a result of the performance of a division operation by said computer, comprising:

a first circuit means responsive to the signals representing the residues of said dividend and said remainder for producing an output signal representing the residue difference between the residue of said dividend and the residue of said remainder;

second circuit means responsive to the signals representing the values of the residue of said divisor for producing a gating signal for all non-zero values of the residue of said divisor;

a third circuit means responsive to the signals representing the residue of said divisor and the output of said first circuit means for performing a residue division of said residue difference by the residue of said divisor;

a fourth circuit means connected to the output of said third circuit means and responsive to said gating signal for gating the output of said fourth circuit means only when said gating signal is present; and comparison means including circuit means for comparing the gated output of said fourth circuit means with the residue of the quotient generated by said computer and circuit means responsive to a signal representing a zero value of the residue of said divisor for comparing the output of said first circuit means with the residue of said divisor, whereby an equal comparison output by said comparison means verifies the correctness of the division operation performed by said computer.

5. A residue error checking system cooperating with a digital computer adapted to produce signals representing each of the possible values of the residues of a quotient, a remainder, a dividend, and a divisor, as a result of the performance of a division operation by said computer, comprising:

a first circuit means responsive to the signals representing the residues of said dividend and said remainder for producing an output signal representing the residue difference between the residue of said dividend and the residue of said remainder;

second circuit means responsive to the signals representing the values of the residue of said divisor for producing a gating signal for all non-zero values of the residue of said divisor;

a third circuit means, responsive to the presence of said gating signal and the signals representing the residue of said divisor and the output of said first circuit means, for performing a residue division of said residue difference by the residue of said divisor only when said gating signal is present; and comparison means responsive to said gating signal for comparing the output of said third circuit means with the residue of the quotient generated by said computer when said gating signal is present, and for comparing the output of said first circuit means with the residue of said divisor, when said gating signal is absent, whereby an equal comparison output by said comparison means verifies the correctness of the division operation performed by said computer.

6. A residue error checking system cooperating with a digital computer adapted to produce signals representing each of the possible values of the residues of a quotient, a remainder, a dividend, and a divisor, as a result of the performance of a division operation by said computer, comprising:

a first circuit means responsive to the signals representing the residues of said dividend and said remainder for producing an output signal representing the residue difference between the residue of said dividend and the residue of said remainder;

second circuit means responsive to the signals representing the values of the residue of said divisor for producing a gating signal for all non-zero values of the residue of said divisor;

a third circuit means, responsive to the presence of said gating signal and the signals representing the residue of said divisor and the output of said first circuit means, for performing a residue division of said residue difference by the residue of said divisor only when said gating signal is present; and comparison means including circuit means responsive to the presence of said gating signal for comparing the output of said third circuit means with the residue of the quotient generated by said computer when said gating signal is present, and including circuit means responsive to the absence of said gating signal for comparing the output of said first circuit means with the signal representing the value of the residue of said divisor when said gating signal is absent, whereby an equal comparison output by said comparison means verifies the correctness of the division operation performed by said computer.

References Cited by the Examiner

UNITED STATES PATENTS 2,936,116 5/1960 Adamson et al. ----- 235—173 X

ROBERT C. BAILEY, *Primary Examiner.*

MALCOLM A. MORRISON, *Examiner.*